US012644334B2

(12) United States Patent
Okachi et al.

(10) Patent No.: US 12,644,334 B2
(45) Date of Patent: Jun. 2, 2026

(54) SCREEN APPARATUS

(71) Applicant: METACO INC., Tokyo (JP)

(72) Inventors: Yasubumi Okachi, Kanagawa (JP); Yuichiro Nishioka, Kanagawa (JP); Hiroaki Ishii, Kanagawa (JP)

(73) Assignee: METACO INC., Tokyo (JP)

( * ) Notice: Subject to any disclaimer, the term of this patent is extended or adjusted under 35 U.S.C. 154(b) by 187 days.

(21) Appl. No.: 18/289,150

(22) PCT Filed: May 26, 2021

(86) PCT No.: PCT/JP2021/019999
§ 371 (c)(1),
(2) Date: Nov. 1, 2023

(87) PCT Pub. No.: WO2022/249334
PCT Pub. Date: Dec. 1, 2022

(65) Prior Publication Data

US 2024/0218734 A1 Jul. 4, 2024

(51) Int. Cl.
*E06B 9/58* (2006.01)
*E06B 9/54* (2006.01)

(52) U.S. Cl.
CPC .................. *E06B 9/58* (2013.01); *E06B 9/54* (2013.01); *E06B 2009/543* (2013.01)

(58) Field of Classification Search
CPC ... E06B 9/522; E06B 9/52; E06B 9/54; E06B 9/58; E06B 2009/543
See application file for complete search history.

(56) References Cited

U.S. PATENT DOCUMENTS 4,467,853 A * 8/1984 Downey, Jr. ............ E06B 9/581 160/133
6,059,007 A * 5/2000 Tomita ...................... E06B 9/54 160/264
6,082,432 A * 7/2000 Kissinger .................. E06B 9/54 160/28
6,186,212 B1 * 2/2001 Tsuchida ................... E06B 9/54 160/84.06
(Continued)

FOREIGN PATENT DOCUMENTS

EP 2 333 229 6/2011
EP 3396101 A1 * 10/2018 ............... E06B 9/54

*Primary Examiner* — Abe Massad
*Assistant Examiner* — John W Hanes, Jr.
(74) *Attorney, Agent, or Firm* — Wenderoth, Lind & Ponack, L.L.P.

(57) ABSTRACT

An adjuster forming a free end of a guide which moves within the slidable frame in a Z-axis direction is connected to a guide unit at an opposite end in the Z-axis direction of the guide. Hollow first stoppers are provided at an end of the adjuster to which the first guide unit is connected, each first stopper having an open end and a closed end on opposite sides in the longitudinal direction of the adjuster. A notch is formed along a rail part of the guide unit to which the adjuster is connected at each inner side surface of both of the first stoppers. A stopping unit is connected to the guide unit that exists at the other end in an X-axis direction of the guide, and has a second stopper extending from each rail part to the other end in the Z-axis direction of each of the side walls.

1 Claim, 7 Drawing Sheets

(56) References Cited

U.S. PATENT DOCUMENTS

| | | | | |
|---|---|---|---|---|
| 6,629,555 | B2 * | 10/2003 | DeBlock | E06B 9/54 160/31 |
| 7,025,105 | B2 * | 4/2006 | Lancina | E06B 9/54 160/41 |
| 7,395,850 | B2 * | 7/2008 | Chino | E06B 9/54 160/243 |
| 7,472,738 | B2 * | 1/2009 | Kamosawa | E06B 9/522 160/31 |
| 7,694,711 | B2 * | 4/2010 | Okachi | E06B 9/58 160/245 |
| 7,717,152 | B2 * | 5/2010 | Moriya | E06B 9/54 160/31 |
| 7,810,543 | B2 * | 10/2010 | Donatelli | E06B 9/54 160/31 |
| 7,829,174 | B2 * | 11/2010 | Kanzaki | B32B 27/12 49/495.1 |
| 7,963,312 | B2 * | 6/2011 | Okachi | E06B 9/262 160/31 |
| 7,984,744 | B2 * | 7/2011 | Karasawa | E06B 9/262 160/84.06 |
| 8,082,969 | B2 * | 12/2011 | Okachi | E06B 9/262 160/84.06 |
| 8,191,601 | B2 * | 6/2012 | Okachi | E06B 9/54 160/31 |
| 8,196,638 | B2 * | 6/2012 | Roberts | E06B 9/54 160/84.06 |
| 8,316,912 | B2 * | 11/2012 | Okachi | E06B 9/52 160/84.06 |
| 8,336,286 | B2 * | 12/2012 | Veltrop | F16G 13/20 222/113 |
| 8,925,614 | B2 * | 1/2015 | Okachi | E06B 9/54 160/31 |
| 8,991,275 | B2 * | 3/2015 | Ishikawa | F16H 19/0636 74/89.2 |
| 9,004,138 | B2 * | 4/2015 | Okachi | E06B 9/54 160/31 |
| 9,487,986 | B2 * | 11/2016 | Okachi | E05D 15/0621 |
| 10,041,294 | B2 * | 8/2018 | Van Loosbroek | E06B 9/262 |
| 11,505,991 | B2 * | 11/2022 | Okachi | E06B 9/54 |
| 2013/0306252 | A1 * | 11/2013 | Lambridis | E06B 9/582 160/133 |
| 2015/0204137 | A1 * | 7/2015 | Montanaro | E06B 9/54 160/84.02 |
| 2019/0048659 | A1 * | 2/2019 | Toda | E06B 9/58 |
| 2019/0234142 | A1 * | 8/2019 | Grützner | H02G 11/006 |
| 2022/0307320 | A1 * | 9/2022 | Okachi | E06B 9/54 |
| 2024/0218734 | A1 * | 7/2024 | Okachi | E06B 9/58 |
| 2024/0218735 | A1 * | 7/2024 | Okachi | E06B 9/54 |
| 2024/0218736 | A1 * | 7/2024 | Okachi | E06B 9/54 |

* cited by examiner

SCREEN APPARATUS

TECHNICAL FIELD

The invention relates to a screen apparatus adaptable to a net door, a partition and the like, as well as a shading and dimming means such as a curtain, a blind and the like.

BACKGROUND ART

Conventionally, the screen apparatus of this kind generally includes a screen that can be freely expanded and stored: on a premise that an expansion and storage direction of the screen is defined as an X-axis direction in orthogonal three axes including the X-axis, a Y-axis, and a Z-axis, a pair of frames consisting of a first frame and a second frame, at least one of which is a slidable frame in the X-axis direction, which are longitudinal in the Z-axis direction and hollow; and which are disposed opposite to each other in the X-axis direction; a first guide and a second guide each of which has a free end at an end, and which are drawn from an inside of the slidable frame when the slidable frame is slid to one side in the X-axis direction and are stored in the inside of the slidable frame when the slidable frame is slid to the other side in the X-axis direction: and a tension member that is stored in the inside of the slidable frame and connects the free ends of the first guide and the second guide. In the screen apparatus, one end in the X-axis direction of the screen is fixed to the first frame and the other end in the X-axis direction of the screen is fixed to the second frame, a portion of the first guide, which is drawn from the inside of the slidable frame, extends linearly in the X-axis direction between one end portions in the Z-axis direction of the pair of the frames, and a portion of the second guide, which is drawn from the inside of the slidable frame, extends linearly in the X-axis direction between the other end portions in the Z-axis direction of the pair of the frames.

As one of such the screen apparatuses, there has been known a screen apparatus in which the first guide is formed by connecting a plurality of first guide units, each of the first guide units includes a pair of side walls disposed opposite to each other in the Y-axis direction when the first guide is drawn from the inside of the slidable frame and a bottom wall connecting both of the side walls, one of two adjacent first guide units is pivotally supported by the other, whereby the first guide not only bends to the other side in the Z-axis direction but also maintains linearity in the X-axis direction, and one end portion in the Z-axis direction of the expanded screen is inserted between both of the side walls of each of the first guide units in the portion of the first guide, which is drawn from the inside of the slidable frame (See Patent document No. 1, for example).

In the above-mentioned screen apparatus, a pair of pins directing inward in an opposite direction of both of the side walls are provided with one end parts in the X-axis direction of both of the side walls of each of the first guide units, which correspond to one end portion in the Z-axis direction of the first guide and which are drawn from the slidable frame, and a pair of openings are opened in the other end parts in the X-axis direction of both of the side walls. Two first guide units are connected to each other by causing each of the pins of the other of the first guide units to loosely fit in each of the openings of one of the first guide units, both of the pins form a pivot, and each of the first guide units are pivotally movable.

Further, a rigid protrusion protruding inward in the opposite direction of both of the side walls is provided with a part of both of the side walls of each of the first guide units, which is disposed at a side of which each of the above-mentioned pins is provided. Each of the rigid protrusions, in the first guide, is disposed along an imaginary line that connects a pivot center of each of the first guide units in a connecting direction of the first guide units. The above-mentioned rigid protrusions stab the one end portion in the Z-axis direction of the screen, which is inserted between both of the side walls of each of the first guide units in a drawn portion of the first guide when the first guide is drawn to the other side in the X-axis direction accompanying sliding of the slidable frame to one side in the X-axis direction. If the expanded screen receives external forces such as a wind pressure, the rigid protrusions hold the one end portion in the Z-axis direction of the screen so as to prevent the one end portion in the Z-axis direction of the screen from slipping out of the drawn portion of the first guide.

However, although the rigid protrusion, each of the first guide units is generally an integrally molded product made of a resin and since the rigid protrusions repeatedly stab and slip out of the one end portion in the Z-axis direction of the screen accompanying expansion and storage of the screen, the rigid protrusions have problems such as deformation due to bending, damage due to breaking, and the like. Additionally, a kind of the screen is generally changed according to a use, an installation site, and the like of the screen apparatus.

Accordingly, in a case where a strength of a molding material of the above-mentioned first guide unit is higher than that of the screen, when the above-mentioned rigid protrusions stab the screen, there is some concern that the one end portion in the Z-axis direction of the screen will be damaged. In order to prevent the screen form being damaged, it is necessary in the above-mentioned screen apparatus for the first guide units to be made of a plurality of molding materials each of which corresponds to the kind of the screen. As a result, a kind of the first guide also becomes plural.

Then, the applicant has proposed that a screen apparatus which can suppress the damage of the one end portion in the Z-axis direction of the screen, which is inserted into the first guide, even by repetition of the expansion and storage of the screen and in which the first guide can be formed by only one kind of the first guide unit in spite of the kind of the screen (Japanese Patent Application No. 2020-038505 (not published at a filing date of the present application)).

In the above-mentioned screen apparatus, a pair of pins directing outward in the opposite direction of both of the side walls are provided with one end part in the X-axis direction of both of the side walls of each of the first guide units and a pair of openings are opened in the other end parts in the X-axis direction of both of the side walls of each of the first guide units, the two adjacent first guide units are connected by causing each of the pins of the other of the first guide units to loosely fit in each of the openings of one of the first guide units, both of the pins form the pivot, and each of the first guide unit is pivotally movable.

Additionally, a rail part is provided at inner side parts in the opposite direction of both of the side walls of each of the first guide units, the rail part extends along an imaginary line that connects a pivot center of each of the first guide units in a connecting direction, and a supporting piece protruding inward in the opposite direction of both of the side walls is provided at end edge parts of both of the side walls, which are disposed further from the bottom wall than the rail parts in the Z-axis direction.

Further, a screen retaining member in which a plurality of needle-like parts aligned at a distance are attached to a longitudinal base that is bendable in a pivotal moving direction of each of the first guide units is detachably attached to an inner side of the opposite direction of both of the side walls of each of the first guide units, in an attached state of each of the screen retaining members, a base is supported between each of the rail parts and each of the supporting pieces of each of the first guide units, and all of the needle-like parts protrude inward in the opposite direction of both of the side walls of each of the first guide units.

Furthermore, when the first guide is drawn to the other side in the X-axis direction accompanying sliding to one side in the X-axis direction of the slidable frame, the needle-like parts of each of the screen retaining members stab the one end portion in the Z-axis direction of the screen, which is inserted between both of the side walls of each of the first guide units in the drawn portion of the first guide, and it is impossible for the screen to slip out of the drawn portion of the first guide, and when the first guide is stored in the inside of the slidable frame accompanying sliding to the other side in the X-axis direction of the slidable frame, the needle-like parts of each of the screen retaining members slip out of the one end portion in the Z-axis direction of the screen.

REFERENCE

Patent document No. 1: EP 2333229 A2

SUMMARY OF INVENTION

Technical Problem

Incidentally, though the base of each of the screen retaining members is, as above-mentioned, supported between each of the rail parts and each of the supporting pieces, each of the rail parts and each of the supporting pieces are opened in a longitudinal direction of the base of each of the screen retaining members. Accordingly, when withdrawal from and storage in the inside of the slidable frame of the first guide are repeated, there is a fear that each of the screen retaining members will slip out in the longitudinal direction of the base from between each of the rail parts and each of supporting pieces of each of the first guides which support the base.

In the light of the above-mentioned problem, the invention provides a screen apparatus, which, despite the repetition of withdrawal from and storage in the inside of the slidable frame of the first guide, can suppress slipping-out of each of the screen retaining members in the longitudinal direction of the base from between each of the rail parts and each of the supporting pieces in each of the first guide units of the first guide without damaging the needle-like parts.

Solution to Problem

The invention presupposes a screen that can be freely expanded and stored: on a premise that an expansion and storage direction of the screen is defined as an X-axis direction in orthogonal three axes including the X-axis, a Y-axis, and a Z-axis, a pair of frames consisting of a first frame and a second frame, at least one of which is a slidable frame in the X-axis direction, which are longitudinal in the Z-axis direction and hollow, and which are disposed opposite to each other in the X-axis direction: a first guide and a second guide each of which has a free end at an end, and which are drawn from an inside of the slidable frame when the slidable frame is slid to one side in the X-axis direction and are stored in the inside of the slidable frame when the slidable frame is slid to the other side in the X-axis direction; and a tension member that is stored in the inside of the slidable frame and connects the free ends of the first guide and the second guide, wherein one end in the X-axis direction of the screen is fixed to the first frame and the other end in the X-axis direction of the screen is fixed to the second frame, a portion of the first guide, which is drawn from the inside of the slidable frame, is configured to extend linearly in the X-axis direction between one end portions in the Z-axis direction of the pair of the frames, and a portion of the second guide, which is drawn from the inside of the slidable frame, is configured to extend linearly in the X-axis direction between the other end portions in the Z-axis direction of the pair of the frames, wherein the first guide is formed by connecting a plurality of first guide units, each of the first guide units includes a pair of side walls disposed opposite to each other in the Y-axis direction when the first guide is drawn from the inside of the slidable frame and a bottom wall connecting both of the side walls, one of two adjacent first guide units is pivotally supported by the other, whereby the first guide not only bends to the other side in the Z-axis direction but also maintains linearity in the X-axis direction, and one end portion in the Z-axis direction of the expanded screen is inserted between both of the side walls of each of the first guide units in the portion of the first guide, which is drawn from the inside of the slidable frame, wherein a pair of pins directing outward in the opposite direction of both of the side walls are provided at one end part in the X-axis direction of both of the side walls of each of the first guide units and a pair of openings are opened in the other end parts in the X-axis direction of both of the side walls of each of the first guide units, the two adjacent first guide units are connected by causing each of the pins of the other of the first guide units to loosely fit in each of the openings of one of the first guide units, both of the pins form a pivot, and each of the first guide unit is pivotally movable, wherein a rail part is provided at inner side parts in the opposite direction of both of the side walls of each of the first guide units, the rail part extends along an imaginary line that connects a pivot center of each of the first guide units in a connecting direction, and a supporting piece protruding inward in the opposite direction of both of the side walls is provided at end edge parts of both of the side walls, which are disposed further from the bottom wall than the rail parts in the Z-axis direction, wherein a screen retaining member in which a plurality of needle-like parts aligned at a distance are attached to a longitudinal base that is bendable in a pivotal moving direction of each of the first guide units is detachably attached to an inner side of the opposite direction of both of the side walls of each of the first guide units, in an attached state of each of the screen retaining members, a base is supported between each of the rail parts and each of the supporting pieces of each of the first guide units, and all of the needle-like parts protrude inward in the opposite direction of both of the side walls of each of the first guide units, and wherein when the first guide is drawn to the other side in the X-axis direction accompanying sliding to one side in the X-axis direction of the slidable frame, the needle-like parts of each of the screen retaining members stab the one end portion in the Z-axis direction of the screen, which is inserted between both of the side walls of each of the first guide units in the drawn portion of the first guide, and it is impossible for the screen to slip out of the drawn portion of the first guide, and when the first guide is stored in the inside of the slidable frame accompanying sliding to the other side in the X-axis direction of the slidable frame, the needle-like parts of each of the screen retaining members slip out of the one end portion in the Z-axis direction of the screen. In the screen apparatus, a longitudinal adjuster that forms the free end of the first guide, to which a weight is attached, and which moves in the inside of the slidable frame in the Z-axis direction is connected to the first guide unit that is positioned at the other end in the Z-axis direction of the first guide when the first guide is stored in the inside of the slidable frame, a pair of hollow first stoppers opposing to each other in the Y-axis direction are provided at an end part to which the first guide unit is connected in the adjuster, each of the first stoppers has an open end at one side of the first guide unit and a closed end at an opposite side in the longitudinal direction of the adjuster to the open end, and a linear notch is formed on an extension line of the rail part of the first guide unit to which the adjuster is connected at each of inner side surfaces in an opposite direction of both of the first stoppers. Additionally, in the screen apparatus, a stopping unit is connected to the first guide unit that exists at a position corresponding to the other end in the X-axis direction in the drawn portion of the first guide when the first guide is drawn from the inside of the slidable frame, and the stopping unit is the same as the first guide unit except that the supporting piece is removed and a second stopper extending from each of the rail parts to the other end in the Z-axis direction of each of the side walls is provided at an end connected to the first guide unit. Further, in the screen apparatus, in an attached state of each of the screen retaining members, one end portion in a longitudinal direction of the base of each of the screen retaining members is configured to be inserted into an inside of each of the first stoppers of the adjuster and to come into contact with the closed end of each of the first stoppers, the other end in the longitudinal direction of the base of each of the screen retaining members is configured to come into contact with each of the second stoppers of the stopping unit, and the needle-like parts are configured to protrude inwardly in the opposite direction of both of the first stoppers through the notch and not to come into contact with each of the second stoppers at a portion of each of the screen retaining members of which the base is inserted into the inside of each of the first stoppers.

According to the invention, in the attached state of each of the screen retaining members to each of the first guide units of the first guide, movements in the longitudinal direction of the base are regulated. Accordingly, even though withdrawal from and storage in the inside of the slidable frame of the first guide is repeatedly performed, slipping out of each of the screen retaining members in the longitudinal direction of the base from between each of the rail parts and each of the supporting pieces which are provided with each of the first guide units of the first guide can be suppressed.

Additionally, the needle-like parts protrude inwardly through the notch in the opposite direction of both of the first stoppers and do not come into contact with each of the second stoppers at one end portion in the longitudinal direction of each of the screen retaining members entering the inside of each of the first stoppers. Accordingly, suppression of the slipping-out of each of the screen retaining members in the longitudinal direction of the base can be realized without damaging the needle-like parts.

DESCRIPTION OF EMBODIMENTS

Figure 1:
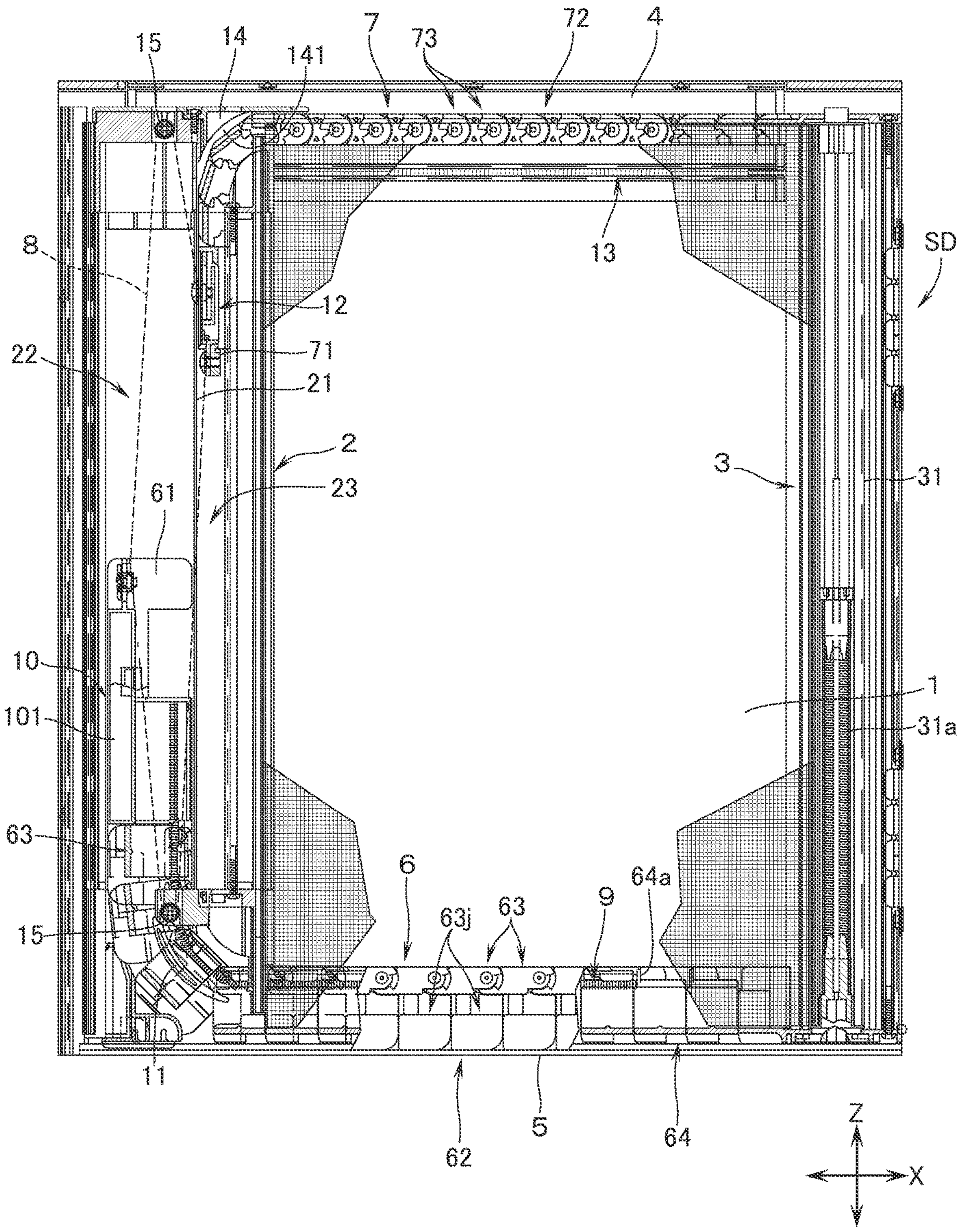
FIG. 1 is a partially notched cross section of an embodiment of a screen apparatus of the invention.

Referring to FIG. 1, a screen apparatus SD of the embodiment includes a screen 1 that can be freely expanded and stored, is installed in an opening such as a window frame, door frame, and the like, and the opening is opened and closed in a horizontal direction by the screen 1, for example. In other words, in the screen apparatus SD, an expansion and storage direction is defined as an X-axis direction in orthogonal three axes including the X-axis, a Y-axis, and a Z-axis, the X-axis direction corresponds to the horizontal direction, i.e., a left-right direction in FIG. 1, and the Z-axis direction corresponds to a vertical direction, i.e., an top-bottom direction in FIG. 1. Accordingly, in the following one side in the X-axis direction is defined to be left and the other side in the X-axis direction is defined to be right, and one side in the Z-axis direction is defined to be bottom and the other side in the Z-axis direction is defined to be top.

The screen apparatus SD includes a first frame 2 that is slidable in the left-right direction of the opening, is longitudinal in the top-bottom direction, and is hollow; and a second frame 3 that is disposed opposite to the first frame 2 in the left-right direction, is fixed to a right end portion of the above-mentioned opening, is longitudinal in the top-bottom direction, and is hollow: A pair of frames consist of the first frame 2 and the second frame 3. A left end of the screen 1 is fixed to the first frame 2 and a right end of the screen 1 is fixed to the second frame 3. Specifically, the left end of the screen 1 is fixed to a right end portion of the first frame 2 and the right end of the screen 1 is fixed to a portion in the top-bottom direction of an outer peripheral part of a roller pipe 31 that is longitudinal in the top-bottom direction, is hollow; and is rotatably stored in an inside of the second frame 3. When a closing operation causes the first frame 2 to slide leftward by a user of the screen apparatus SD, the screen 1 is unwound from the outer peripheral part of the roller pipe 31 and is expanded in the opening and when the closing operation by the user is stopped, the screen 1 is wound around the outer peripheral part of the roller pipe 31 and is stored in the inside of the second frame 3. At this time, the first frame 2 automatically slides rightward and when a right end of the first frame 2 comes into contact with a left end of the second frame 3, the sliding of the first frame 2 rightward is automatically stopped.

In order to realize such the automatic storage of the screen 1 in the inside of the second frame 3, a coil spring 31*a* is built in the inside of the roller pipe 31. When the first frame 2 is slid leftward, the coil spring 31*a* rotates forward in the inside of the second frame 3 and when the screen 1 is unwound from the outer peripheral part of the roller pipe 31, the coil spring 31*a* is twisted around a rotation axis of the roller pipe 31, and an elastic force is generated and accumulated. When the user stops a closing operation, the accumulated elastic force is released, the roller pipe 31 reverses in the inside of the second frame 3, and the screen 1 is wound around the outer periphery of the roller pipe 31.

Additionally, in order to smoothly realize the sliding in left-right direction of the first frame 2, the screen apparatus SD includes an upper rail 4 and a lower rail 5. The upper rail 4 is provided at an upper end portion of the opening and the lower rail 5 is provided at a lower end of the opening. The upper rail 4 is a hollow member of which a section in the top-bottom direction is U-shaped and an upper end portion of the first frame 2 is inserted into an inside of the upper rail 4. The lower rail 5 is a longitudinal and linear member in the left-right direction. Wheels, not shown, are provided at a lower end portion of the first frame 2 and roll on the lower rail 5. Since the siding in the left-right direction of the first frame 2 is guided by the upper rail 4 and the lower rail 5, the sliding of the first frame 2 in the left-right direction is smoothly realized.

Further, the screen apparatus SD includes a first guide 6 and a second guide 7 that are drawn from the inside of the first frame 2 when the first frame 2 is slid leftward, and which are stored in the inside of the first frame 2 when the first frame 2 is slid rightward. The first guide 6 and the second guide 7 have free ends 61, 71 at an end, respectively, portions 62, 72 drawn from the inside of the first frame 2 maintain linearity in the left-right direction, and the portion 62 extends in the left-right direction between the lower end portions of the first frame 2 and the second frame 3 as the pair of the frames. Similarly, the portion 72 extends in the left-right direction between the upper end portions of the first frame 2 and second frame 3. Furthermore, the screen apparatus SD includes a tension member 8 that is stored in the inside of the first frame 2 and connects the free ends 61, 71 of the first guide 6 and the second guide 7. The tension member 8 is formed into a non-crossing loop and is disposed in the top-bottom direction. The loop of the tension member 8 may be a crossing loop.

Referring to FIG. 2, FIG. 3A, FIG. 3B, FIG. 4A, FIG. 4B, FIG. 4C, and FIG. 4D, the first guide 6 is formed by connecting of a plurality of first guide units 63. Each of the first guide units 63 includes a pair of side walls 63*a*, 63*a* shown in FIG. 2, which are disposed opposite to each other in the Y-axis direction, and a bottom wall 63*b* connecting both of the side walls 63*a*, 63*a*. In the first guide 6, one of two adjacent first guide units 63, 63 is pivotally supported by the other. The first guide 6 maintains linearity in the left-right direction and upwardly bends due to pivotal support. Additionally, upper left end parts and upper right end parts of both of the side walls 63*a*, 63*a* of each of the first guide units 63 correspond to an upper end portion of the portion 62 of the first guide 6 drawn from the inside of the first guide 6. A pair of pins 63*c*, 63*c* directing outward in an opposite direction of both of the side walls 63*a*, 63*a* are provided with the upper left end parts, and a pair of openings 63*d*, 63*d* are opened in the upper right end parts.

Specifically, a first recessed part 63*a*$_1$ recessed inward in the opposite direction of both of the side walls 63*a*, 63*a* is formed at a peripheral part of each of the pins 63*c* in each of the side walls 63*a* of each of the first guide units 63. A length of each of the pins 63*c* is equal to a depth of the first recessed part 63*a*$_1$, and an outer diameter of each of the pins 63*c* and an inner diameter of each of the openings 63*d* are of such a size that each of the pins 63*c* can be loosely fitted in each of the openings 63*d*. Additionally, a first notched part 63*a*2 is formed by notching a peripheral part of each of the openings 63*d* with leaving an upper end edge part of each of the side walls 63*a* and the upper end edge part becomes a protruding piece 63*e* extending rightward. Further, a hill part 63*f* rising upwardly is provided with a right and lower end portion of the first recessed part 63*a*$_1$. Furthermore, a second recessed part 63*a*3 with the same depth as the one of the first recessed part 63*a*$_1$ is formed at a portion positioned at a lower end portion of each of the side walls 63*a* and below the first recessed part 63*a*$_1$. Then, the bottom wall 63*b* is disposed at a position corresponding to a lower end portion of the second recessed part 63*a*3 of both of the side walls 63*a*, 63*a* in each of the first guide units 63, and has a length from a left end of the second recessed part 63*a*3 to a left and lower end of the first notched part 63*a*2.

In the first guide 6, the two adjacent first guide units 63, 63 are connected by inserting the left end parts of both of the side walls 63*a*, 63*a* of the other of the first guide units 63 into an inner side of the right end parts of one of the first guide units 63 in the opposite direction of both of the side walls 63*a*, 63*a* and by loosely fitting each of the pins 63*c* of the other of the first guide units 63 in each of the openings 63*d* of one of the first guide units 63. At this time, both of the pins 63*c*, 63*c* form a pivot. The first guide 6 is formed by repetition of such connection of the two adjacent first guide units 63, 63. A pivotal movement range of the two adjacent first guide units 63, 63 is from a position at which the right ends of the lower end parts of both of the side walls 63*a*, 63*a* of one of the first guide units 63 and the left ends of the lower end parts of both of the side walls 63*a*, 63*a* of the other of the first guide units 63 contact to a position at which each of the protruding pieces 63*e* of both of the side walls 63*a*, 63*a* of the one of the first guide units 63 and the hill part 63*f* of each of the first recessed parts 63*a*$_1$ that are formed at both of the side walls 63*a*, 63*a* of the other of the first guide units 63 contact. The pivotal movement range of each of the first guide units 63 is identical, and due to the pivotal movement in the above-mentioned pivotal movement range of each of the first guide units 63, the first guide 6, as shown in FIG. 1, bends so as to direct toward the upper end portion of the first frame 2 when the first guide 6 is stored in the inside of the first frame 2, and the first guide 6 directs rightward and returns to a linear state when the first guide 6 is drawn from the inside the first frame 2.

In this connection, when the first guide 6 is drawn from the inside of the first frame 2, each of the second recessed parts 63*a*3 that are formed at both of the side walls 63*a*. 63*a* of one of the two adjacent first guide units 63, 63, which pivotally moves, is inserted into the inside in the opposite direction of both of the side walls 63*a*, 63*a* of the other first guide units 63. Therefore, outer side surfaces in the opposite direction of the lower parts of both of the side walls 63*a*, 63*a* of each of the first units 63 are disposed in a same plane in the drawn portion 62 of the first guide 6 from the inside of the first frame 2. Additionally, as above-mentioned, since the length of each of the pins 63*c* is equal to the depth of the first recessed part 63*a*$_1$, an outer side surface in the opposite direction of both of the side walls 63*a*, 63*a* of each of the pins 63*c* and an outer surface in the opposite direction of the upper parts of both of the side walls 63*a*, 63*a* are disposed in a same plane.

Additionally, a rail part 63*g* is provided at an inner side portion in the opposite direction of each of the side walls 63*a*, 63*a* of each of the first guide units 63 and the rail part 63*g* extends along an imaginary line VL that connects a center of the above-mentioned pivot of each of the first guide units 63. Further, a supporting piece 63*h* protruding inward in the opposite direction of both of the side walls 63*a*, 63*a* is provided at each of the upper end edge parts of both of the side walls 63*a*, 63*a*, which is further upward from the bottom wall 63*b* than the rail part 63*g*. Each of the supporting pieces 63*h* is disposed, in the top-bottom direction, opposite to each of the rail parts 63*g* of each of the side walls 63*a* at a side that each of the supporting pieces 63*h* is provided and a storage part 63*i* that is hollow is formed between each of the supporting pieces 63*h* and each of the rail parts 63. See FIG. 4D. Specifically, each of the rail parts 63*g* has a length from the left end of each of the first guide units 63 to the lower left end of the first notched part 63*a*2. On the other hand, each of the supporting pieces 63*h* extends in the left-right direction except the left end part of each of the first guide units 63. Additionally, a front shape of each of the supporting pieces 63*h* is L-shaped, and each of the supporting pieces 63*h* consists of a locking part 63*h*1 suspending in parallel with respect to each of the side walls 63*a* and an inclined part 63*h*2 extending downhill to a side of the rail part 63*g*.

Figure 5A:
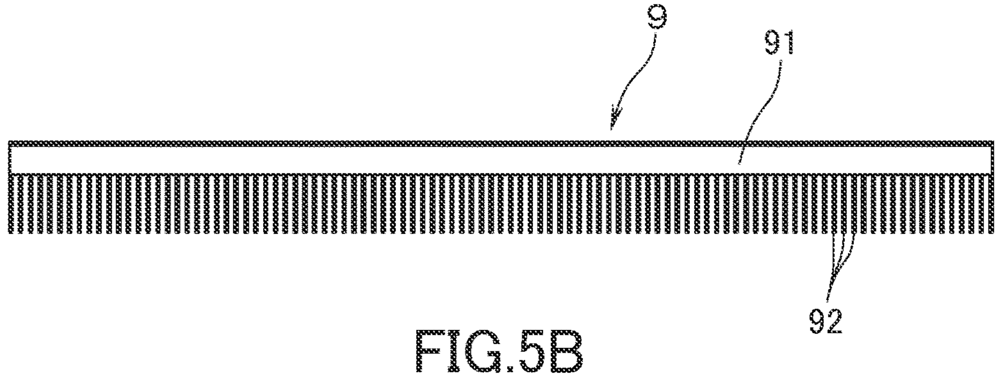
FIG. 5A is a side view and FIG. 5B is a front view, of a screen retaining member shown in FIGS. 2, 3A and 3B.
Figure 5B:
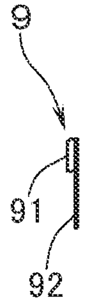

Each of the rail parts 63*g* functions as a guide when the screen retaining members 9 are attached to and detached from the first guide 6. With reference also to FIGS. 5A and 5B, the screen retaining member 9 consists of a longitudinal base 91 that is bendable in a pivotal moving direction of each of the first guide units 63 of the first guide 6 and longitudinal, and a plurality of needle-like parts 92 that are aligned at a distance and attached to the base 91. The screen retaining member 9 is attached to the inner side in the opposite direction of both of the side walls 63*a*, 63*a* of each of the first guide units 63 by inserting the base 91 into an inside of each of the storage parts 63*i* of each of the first guide units 63 from one of right and left ends of the first guide 6. Each of the rail parts 63*g* guides the insertion of the base 91 into the storage part 63*i* during attachment of the screen retaining member 9. The base 91 is supported between each of the rail parts 63*g* and each of the supporting pieces 63*h* and all of the needle-like parts 92 protrude inward in the opposite direction of both of the side walls 63*a*, 63*a* of each of the first guide units 63. Additionally, the screen retaining member 9 can be detached from the first guide 6, while being guided by each of the rail parts 63*g*, by drawing the base 91 from the inside of each of the storage parts 63*i* of each of the first guide units 63 from one of the right and left ends of the first guide 6.

Figure 2:
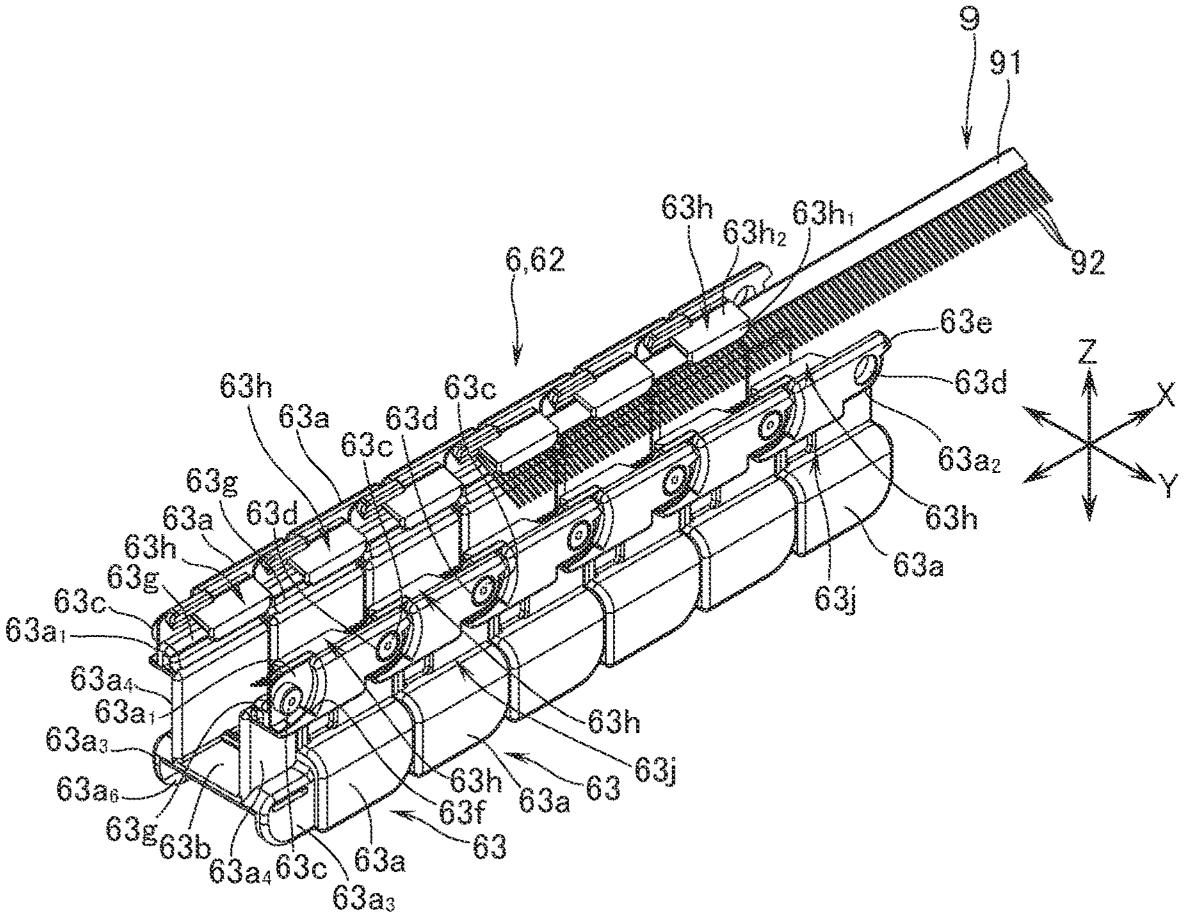
FIG. 2 is a main perspective view of a first guide as an embodiment of the screen apparatus shown in FIG. 1.

Specifically, the base 91 is locked by the locking part 63*h*1 of the supporting piece 63*h* of each of the first guide units 63 and all of the needle-like parts 92 are inclined to a side of the bottom wall 63*b* along the downward slope of the inclined part 63*h*2 by the inclined part 63*h*2. See FIG. 3B. Due to the inclination of all of the needle-like parts 92, gaps in the Y-axis direction, which are shown in FIG. 2, are formed between tip ends in a protruding direction of the needle-like parts 92 of two of the screen retaining members 9 attached to both of the side walls 63*a*, 63*a* of each of the first guide units 63 in the first guide 6.

Figure 3A:
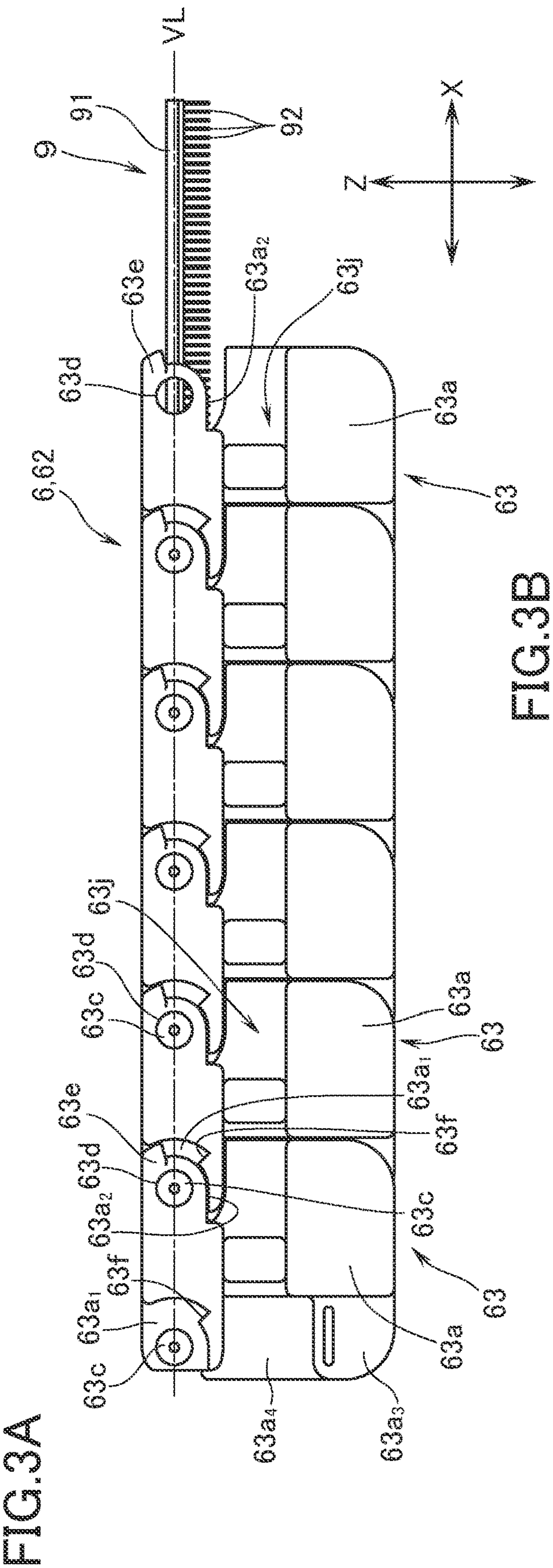
FIG. 3A is a side view of the first guide shown in FIG. 2
Figure 6:
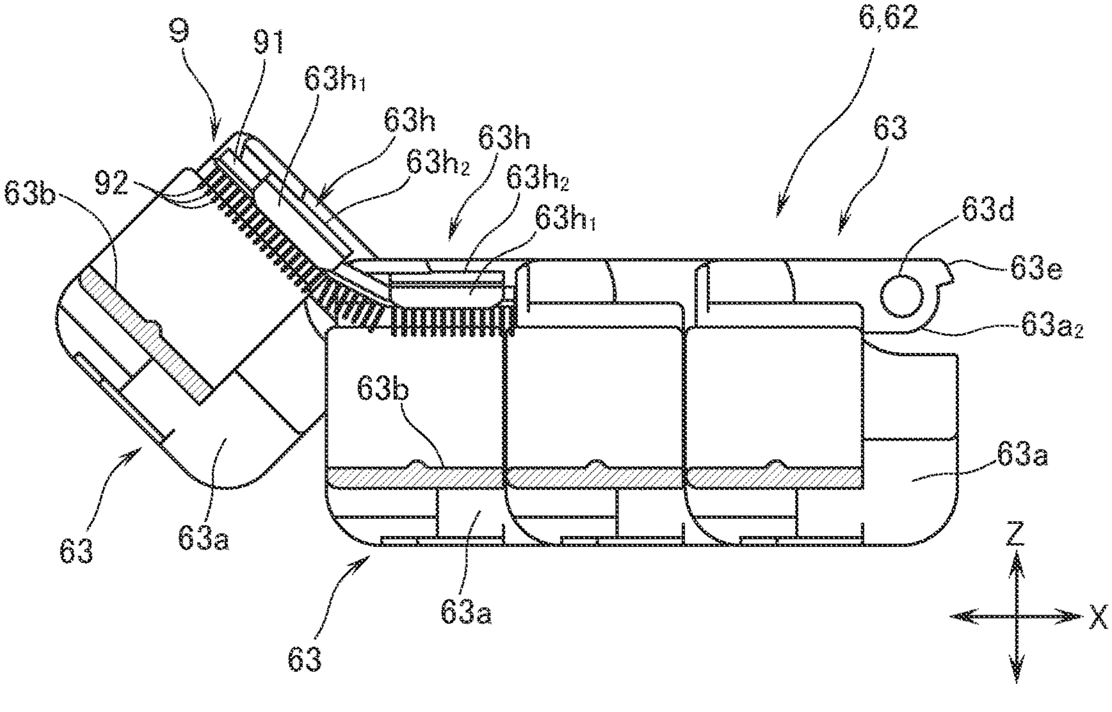
FIG. 6 is a main notched side view of in a bent state of the screen retaining member when the first guide shown in FIGS. 2, 3A, and 3B is bent.

Since the bases 91 of the screen retaining members 9 are bendable in the pivotal moving direction of each of the first guide units 63 of the first guide 6, when the first guide 6 shown in FIG. 1 bends upward, as shown in FIG. 6, the screen retaining members 9 also bend in the same direction. Additionally, as above-mentioned, since each of the rail parts 63*g* extends along the imaginary line VL that connects the center of the above-mentioned pivot of each of the first guide units 63, as shown in FIG. 3A, the base 91 of each of the screen retaining members 9 attached to the inner side in the opposite direction of both of the side walls 63*a*, 63*a* of each of the first guide units 63 is disposed in parallel to the imaginary line VL. The pivotal movement of each of the first guide units 63, i.e., the bending of the first guide 6 is smoothly realized by disposition of the base 91 in parallel to the imaginary line VL. Additionally, since the above-mentioned pivot is positioned at the upper end part of the each of the first guide units 63, the above-mentioned pivot is disposed further upward from the lower end of the above-mentioned opening in which the screen apparatus SD is installed. Accordingly, the pivot is less susceptible to dust, sand, mud, and the like which are easily accumulated on the lower end of the above-mentioned opening, and coupled with the smooth bending of the first guide 6, a closing operation of the first frame 2 by the user is performed lightly and stably. Similarly, since the base 91 of the screen retaining member 9 easily returns to the linear state from a bent state, the return of the first guide 6 from the bent state to the linear state when the first guide 6 is drawn from the inside of the first frame 2 can also be smoothly realized. Accordingly, an opening operation of the first frame 2 is also performed lightly and stably.

Further, a concave part 63*j* that extends in the same direction as the portion 62 of the first guide 6, which is drawn from the inside of the first frame 2, extends and is recessed inward in the opposite direction of both of the side walls 63*a*, 63*a* is provided with both of the side walls 63*a*, 63*a* of each of the first guide units 63. A third recessed part 63*a*4 that is recessed inward in the opposite direction of both of the side walls 63*a*, 63*a* and is similar to the first recessed part 63$a_1$ and the second recessed part 63*a*3 is formed at the left end part of the both of the side walls 63*a*, 63*a*, at which the concave part 63*j* is provided. The third recessed part 63$a_4$ is positioned between the first recessed part 63$a_1$ and the second recessed part 63$a_3$ at each of the side walls 63*a*. Additionally, a second notched part 63$a_5$ is formed by cutting an inner surface in the opposite direction of the right end part of both of the side walls 63*a*, 63*a*, at which is the concave part 63*j* is provided. See FIGS. 4B and 4C. When the first guide 6 is drawn from the inside of the first frame 2 and each of the first guide units 63 pivotally moves, the second notched part 63$a_3$ of the first guide unit 63 that pivotally moves overlaps on the third recessed part 63$a_4$ of the first guide unit 63 that has finished pivotal movement and is disposed adjacent to the first guide unit 63 that pivotally moves. Linearity of the portion 62 of the first guide 6, which is drawn from the inside of the first frame 2, is maintained by overlapping of the second notch 63$a_3$ on the third recessed part 63*a*4 and a contact between the right end of the lower end part of both of the side walls 63*a*, 63*a* of the first guide unit 63 that pivotally moves and the left end of both of the side walls 63*a*, 63*a* of the first guide unit 63 that has finished pivoting. Additionally, the inner surfaces in the opposite direction of both of the side walls 63*a*, 63*a*, at which the concave parts 63*j* are formed, respectively, are placed flush with each other.

Figure 3B:
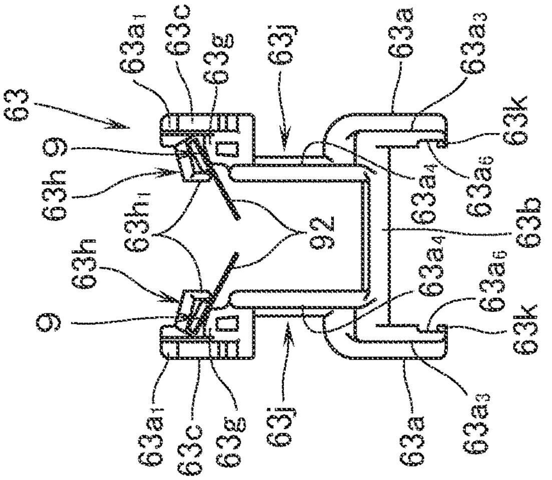
FIG. 3B is a front view of the first guide shown in FIG. 2.
Figure 4A:
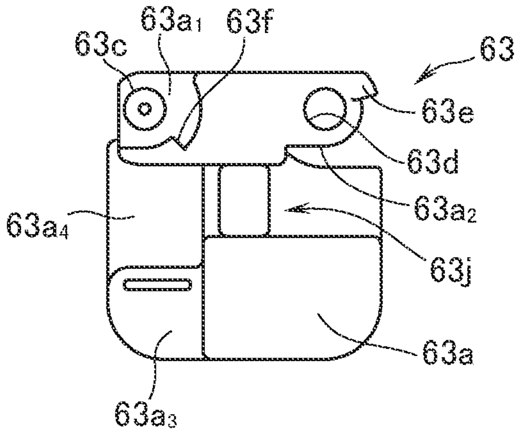
FIG. 4A is a side view.
Figure 4B:
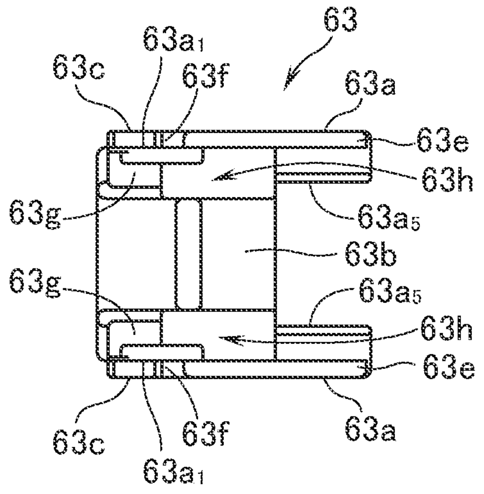
FIG. 4B is a plan view.
Figure 4C:
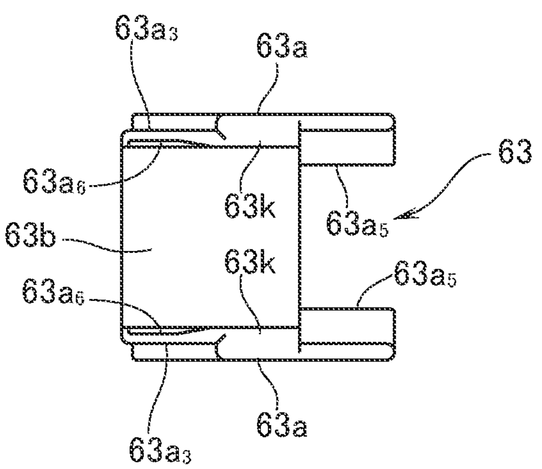
FIG. 4C is a bottom view.
Figure 4D:
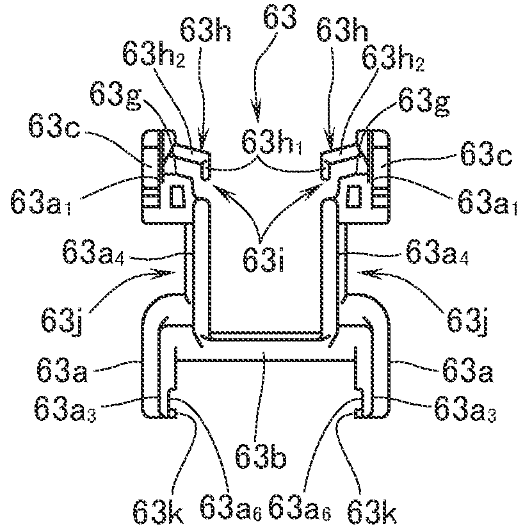
FIG. 4D is a front view, of the first guide unit shown in FIGS. 2, 3A and 3B.

In this connection, at both of the side walls 63*a*, 63*a* of each of the first guide units 63, as shown in FIGS. 3B, 4C and 4D, the inner surface in the opposite direction of the lower end part of each of the second recessed parts 63$a_3$ is notched and the third notched part 63*a*6 is formed. A notch depth of each of the third notched parts 63*a*6 is reduced from the light end to the right end of each of the second recessed parts 63*a*3. Additionally, a guided piece 63*k* continuously protruding inward in the opposite direction of both of the side walls 63$a$. 63$a$ from the right end of each of the third notched parts 63$a$6 is provided. A right end of each of the guided pieces 63$k$ is positioned below the right end of the bottom wall 63$b$. When the first guide 6 is drawn from the inside of the first frame 2, both of the guided pieces 63$k$, 63$k$ engage with one side end portion and the other side end portion in the Y-axis direction of the lower rail 5 shown in FIG. 1, respectively, whereby each of the first guide units 63 in the drawn portion 62 of the first guide 6 is suppressed to separate from the lower rail 5. On the other hand, when the first guide 6 is stored in the inside of the first frame 2, each of the third notched parts 63$a$6 causes the engagement of the each of the guided pieces 63$k$ with one side end portion and the other side end portion in the Y-axis direction of the lower rail 5 to smoothly release, and separation of the each of the first guide units 63 from the lower rail 5 is facilitated. As a result, the sliding in the left-right direction of the first frame 2 is realized more smoothly.

Returning to FIG. 1, a right end of the first guide 6 is fixed to the lower end portion of the second frame 3 and becomes a fixed end. Additionally, the free end 61 of the first guide 6 is always stored in the inside of the first frame 2. Specifically, the free end 61 is positioned at an upper end of an adjuster 10 that moves up and down in the top-bottom direction in the inside of the first frame 2. The adjuster 10 is connected to the first guide unit 63 positioned at an upper end when the first guide 6 is stored in the inside of the first guide 6. A weight 101 that is longitudinal in the top-bottom direction and lumpy is attached to the adjuster 10. Gravitational force acting on the weight 101 acts on the portion of the first guide 6, which is stored in the inside of the first frame 2. When the first frame 2 is caused to slide leftward, such the gravitational force assists the first guide 6 to be smoothly drawn rightward from the inside of the first frame 2 against the elastic force of the coil spring 31$a$ built in the roller pipe 31 and provides the closing operation by the user a comfortable and stable feeling. Additionally, when the first frame 2 is slid rightward and the screen 1 is stored in the inside of the second frame 3, the gravitational force acting on the weight 101 provides a suitable resistance to the storage of the first guide 6 in the inside of the first frame 2. Rapid winding of the screen 1 around the outer periphery of the roller pipe 31 due to release of the elastic force accumulated in the coil spring 31$a$ is suppressed by the resistance.

A curved protrusion 11 curved by a prescribed curvature is provided with a pair of inner side surfaces, not shown, opposite to each other in the Y-axis direction shown in FIG. 1. The curved protrusion 11 guides the storage of the first guide 6 in the inside of the first frame 2 and the withdrawal of the first guide 6 from the in the inside of the first frame 2 due to insertion of the curved protrusion 11 into the concave part 63$j$ of each of the first guide units 63. In other words, the curved protrusion 11 is curved by the prescribed curvature that can bend the first guide 6 so as to direct upward and return the first guide 6 rightward in the inside of the first frame 2. Accordingly, a smoother storage of the first guide 6 in the inside of the first frame 2 and a smoother withdrawal of the first guide 6 from the first frame 2 are realized.

In the screen apparatus SD, when the first guide 6 is drawn from the inside of the lower portion of the first frame 2 rightward accompanying the leftward sliding of the first frame 2, a lower end portion of the screen 1 is inserted between both of the side walls 63$a$. 63$a$ of each of the first guide units 63 in the drawn portion 62 of the first guide 6. Specifically, the lower end portion of the screen 1 is inserted into the above-mentioned gaps between the tip ends in the protruding direction of the needle-like parts 92 shown in FIGS. 2, 3A and 3B of the two screen retaining members 9 attached to both of the side walls 63$a$, 63$a$ of each of the first guide units 63. At this time, each of the needle-like parts 92 of the screen retaining members 9 stabs the lower end portion of the screen 1 and it becomes impossible for the screen 1 to slip out of the drawn portion 62 of the first guide 6. Additionally, when the first guide 6 is stored in the inside of the first frame 2 accompanying the rightward sliding of the first frame 2, the needle-like parts 92 of each of the screen retaining members 9 slip out of the lower end portion of the screen 1, which the needle-like parts 92 have stabbed. As above-mentioned, in the screen apparatus SD, since the screen retaining members 9) are detachably attached to the inner sides in the opposite direction of both of the side walls 63$a$, 63$a$ of each of the first guide units 63 of the first guide 6, multiple kinds of the screen retaining members 9 which are made by attaching a plurality of the needle-like parts 92 corresponding to the kind of the screen 1 to the base 91 can be prepared in advance. Further, an appropriate screen retaining member 9 selected from the multiple species can be attached to both of the side walls 63$a$, 63$a$ of each of the first guide units 63 of the first guide 6, whereby damage to the lower end portion of the screen 1 can be suppressed even by repetition of expansion and storage of the screen 1. Additionally, it is not necessary for the first guide unit 63 to be made of each kind of the screens 1 and the first guide 6 can be made of only one kind of the first guide unit 63.

In this connection, an integrally molded product made of a hard resin can be adopted to each of the first guide units 63. A cloth and a net knitted with fibers made of a resin and the like can be adopted to the screen 1 under consideration of weight reduction. A soft resin, a light metal and the like can be adopted to a material for the base 91 of the screen remaining member 9. The needle-like parts 92 are made of an appropriate material to the kind of the screen 1. Additionally, a size of each of the needle-like parts 92 and a distance between the needle-like parts 92 can be appropriately set corresponding to the kind of the screen 1. For example, in a case where the screen 1 is a knitted fabric or a net, the size of each of the needle-like parts 92 can be a size which each of the needle-like parts 92 can enter a stitch or a mesh, and the distance between each of the needle-like parts 92 can be equal to that between the stiches or the meshes. Further, the curved protrusion 11 can be made of a material such that each of the first guide units 63 is not easily worn out even by repetitive insertion of the curved protrusion 11 into the concave part 63$j$ of each of the first guide units 63.

Furthermore, the second guide 7 that is provided with the screen apparatus SD can be adopted to a conventional one. Similar to the first guide 6, the conventional guide is also formed by connecting of a plurality of second guide units 73. Each of the second guide units 73 also includes a pair of side walls, which are disposed opposite to each other in the Y-axis direction, when the second guide 7 is drawn from the inside of the first frame 2, and a bottom wall connecting the side walls. Additionally, one of two adjacent second guide units 73 is pivotally supported by the other of the two adjacent second guide units 73. The second guide 7 may be any of which an upper end portion of the expanded screen 1 is inserted between both of the side walls of each of the second guide units 73 in a drawn portion 72 of the inside of the first frame 2. Similar to the first guide 6, a right end of the second guide 7 is fixed to the second frame 3 and becomes a fixed end.

In the screen apparatus SD, each of the first guide 6 and the second guide 7 is stored in a separate region of the inside of the first frame 2. In other words, a first guiding piece 21 extending in the longitudinal direction of the first frame 2 and protruding inward in the opposite direction of both of the inner side surfaces is provided with each of a pair of inner side surfaces except both of the upper and lower end portions of the first frame 2, which are opposite in the Y-axis direction of the first frame 2. The inside of the first frame 2 is divided into a first storage portion 22 for storing the first guide 6 and a second storage portion 23 for storing the second guide 7 by both of the first guiding pieces 21. The first storage portion 22 is positioned at a left side that is one side in the X-axis direction of the inside of the first frame 2 and the second storage portion 23 is positioned at a right side that is the other side in the X-axis direction of the inside of the first frame 2. The first guide 6 and the second guide 7 that are stored in the inside of the first frame 2 do not collide with each other but pass each other in the inside of the first frame 2 due to the division of the storage regions of the first guide 6 and the second guide 7 in the inside of first frame 2 into the first storage portion 22 and the second storage portion 23. Therefore, entire length of each of the first guide 6 and the second guide 7 can correspond to a size in the left-right direction of the opening in which the screen apparatus SD is installed. Additionally, the needle-like parts 92 of the screen retaining members 9 attached to the inner sides in the opposite direction of both of the side walls 63*a*. 63*a* of each of the first guide units 63 of the first guide 6 are not damaged by the second guide 7 and structural constraints are not imposed on the second guide unit 73 forming the second guide 7. Further, in each of the first guide units 63 of the first guide 6, in order to make it less susceptible to dust, sand, mud, and the like that are easily accumulated on the lower end of the above-mentioned opening in which the screen apparatus SD is installed, the bottom wall 63*b* in the drawn portion 62 of the first storage portion 22 is positioned away from the lower rail 5. Therefore, a size in the top-bottom direction of each of the first guide units 63 of the first guide 6 becomes relatively large. Accordingly, the curvature of bending of the first guide 6 when the first guide 6 is stored in and drawn from the first storage portion 22 can become relatively large due to the first storage portion 22 that is positioned at the left side in the inside of the first frame 2, and the storage of the first guide 6 in the first storage portion 22 and the withdrawal of the first guide 6 from the first storage portion 22 are performed more smoothly.

In this connection, protruding ends of both of the first guiding pieces 21, 21 are disposed away from each other in the Y-axis direction and the tension member 8 is possible to enter both the first storage portion 22 and the second storage portion 23. Additionally, both of the first guiding pieces 21, 21 guide not only up and down movements of the adjuster 10 of the first guide 6 but also up and down movements of the guided member 12 that is connected to the second guide unit 73 positioned at a lower end portion of the second guide 7 when the second guide 7 is stored in the second storage portion 23 and forms the free end 71 of the second guide 7. The free end 71 of the second guide 2 is positioned at a lower end of the guided member 12.

Thus, in a case where the first guide 6 and the second guide 7 are configured to be stored in the first storage portion 22 and the second storage portion 23 that are separate regions in the inside of the first frame 2, respectively, an aspect size, i.e., a size in the left-right direction, of the first frame 2 becomes relatively large. Taking into consideration of the aspect size of the first frame 2, it is preferable that the size in the top-bottom direction of both of the side walls of each of the second guide units 73 in the drawn portion 72 of the second storage portion 23 of the first frame 2 is shorter than that in the top-bottom direction of both of the side walls 63*a*, 63*a* of each of the first guide units 63 in the drawn portion 62 of the first storage portion 22 of the first frame 2. In a case where it is difficult for the screen retaining member 9 to be attached to the first guide 6 is attached to the second guide 7, a screen retaining member 13 that is longitudinal in the left-right direction is attached to each of a pair of inner side surfaces opposing to each other in the Y-axis direction of the upper rail 4 through a supporting piece and the like. The similar constitution to that of the screen retaining member 9 is adopted to the screen retaining member 13, for example. In this case, each of the needle-like parts of the screen retaining member 13 stabs the upper end portion of the expanded screen 1 and slipping-out of the expanded screen 1 from the upper rail 4 due to receiving of an external force such as a wind pressure can be suppressed. Additionally, damage to the upper end portion of the screen 1 can be suppressed even by repeating the expansion and storage of the screen 1.

In the screen apparatus SD, a bending guide 14 having a curved surface 141 curved by a prescribed curvature is provided at the upper end portion of the second storage portion 23 of the first frame 2. The curved surface 141 of the bending guide 14 is capable of coming into contact with the bottom wall of each of the second guide units 73 forming the second guide 7. Due to the contact between the curved surface 141 and the bottom wall of each of the second guide units 73, the bending guide 14 causes each of the second guide units 73 to pivotally move and bends the second guide 7 downward, and causes the second guide 7 to return in the left-right direction. Therefore, the storage of the second guide 7 in the second storage portion 23 and the withdrawal of the second guide 7 from the second storage portion 23 accompanying the sliding of the first frame 2 in the left-right direction are smoothly realized. The prescribed curvature of the curved surface 141 can be appropriately set under consideration of such the bending and returning of the second guide 7.

Further, a direction changing member 15 such as a pulley is provided at each of the upper and lower end portions of the first storage portion 22 of the first frame 2 in the screen apparatus SD. The tension member 8 is hung on each of the direction changing members 15. Each of the direction changing members 15 causes a direction of the tension member 8 to change in the Z-axis direction and provides a prescribed tension to the tension member 8.

Figure 7A:
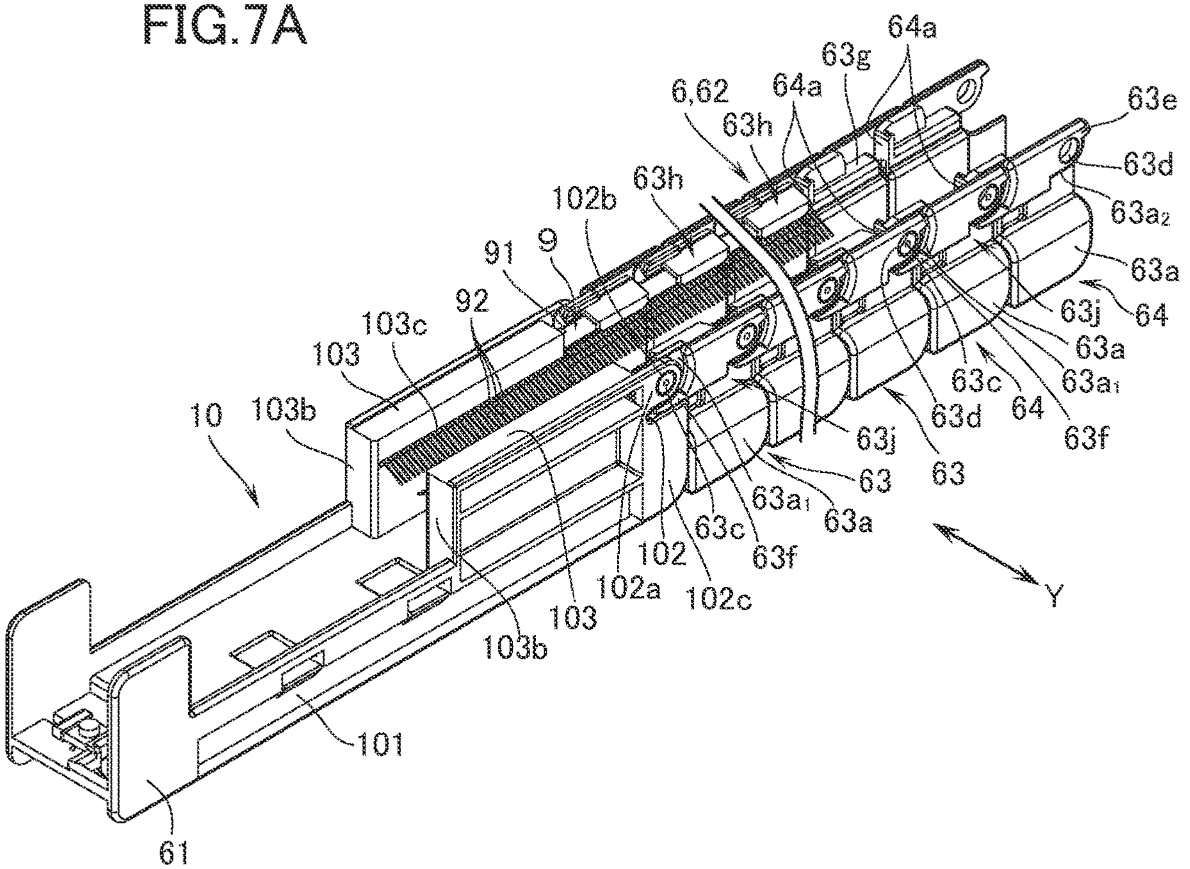
FIGS. 7A and 7B are main perspective views of a connecting state of an adjuster and a stopping unit to the first guide shown in FIG. 2, respectively.
Figure 7B:
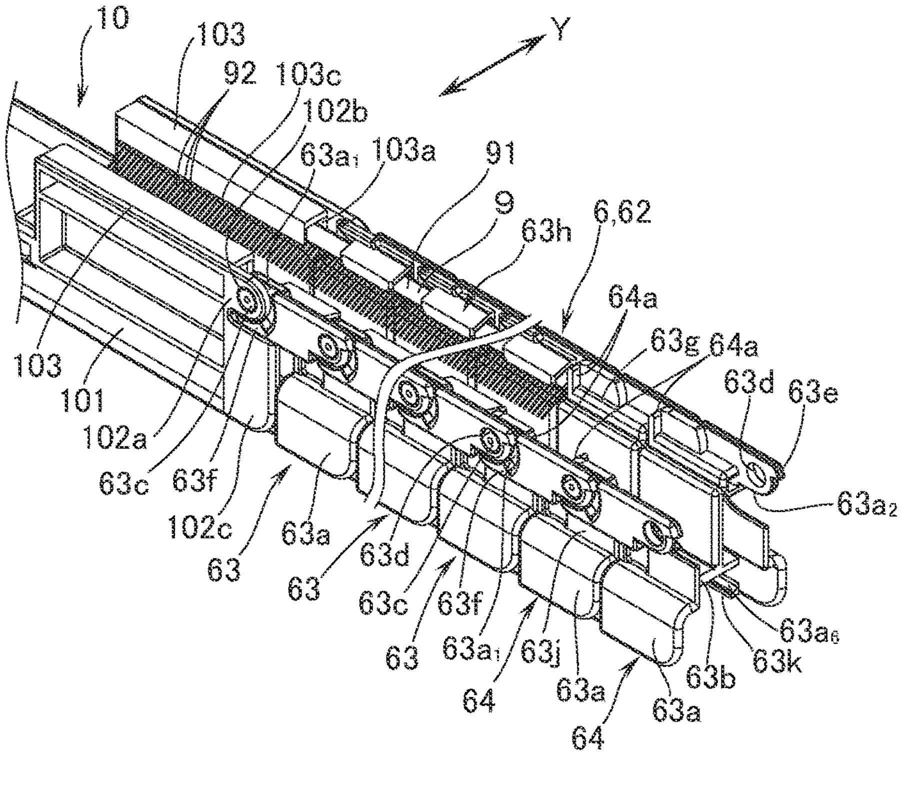

Referring FIGS. 7A and 7B, the adjuster 10 and a stopping unit 64 connected to the first guide unit 63 of the first guide 6 are mentioned. In the following, with respect to the adjuster 10, the same symbols will be placed on the parts and the like which have been mentioned and explanations of the same will be omitted. Additionally, the stopping unit 64 has the parts common to those of the first guide unit 63, and the same symbols are placed on the parts common to those of the first guide unit 63 in the stopping unit 64 and explanations of the same are omitted.

In the adjuster 10, a linear slit 102 for avoiding coming into contact with each of the hill part 63*f* of the first guide unit 63 to be connected is formed at a part corresponding to the lower end part shown in FIG. 1. Parts of the adjuster 10 from the slit 102 to a side to be disposed at the second storage portion 23 of the inside of the first frame 2 shown in FIG. 1 are a pair of tongue piece parts 102*a*, 102*a* opposing to each other in the Y-axis direction and each of the tongue piece parts 102*a* has a thickness corresponding to the depth of the first concave part 63*a*$_1$ of the first guide unit 63 to be connected. An opening 102*b* in which the pin 63*c* of the first guide unit 63 to be connected is loosely fitted is opened in each of the tongue piece parts 102*a*. Additionally, parts from the slit 102 to an opposite side to the second storage portion 23 are a pair of skirt parts 102*c*, 102*c* opposing to each other in the Y-axis direction and each of the skirt parts 102*c* is disposed at an outside of the second recessed part 63*a*$_3$ shown in FIG. 2 and the like of the first guide unit 63 to be connected. Each of surfaces positioned outside in an opposite direction of both of the skirt parts 102*c*, 102*c* is disposed in a same plane with each of the surfaces positioned outside in the opposite direction of both of the side walls 63*a*, 63*a* of the first guide unit 63 to be connected.

Additionally, in the adjuster 10, at a part adjacent to each of the tongue piece parts 102*a* and each of the skirt part 102*c* of which a position in the Y-axis direction is the same, i.e., at an end part of a side, to which is the first guide unit 63 is connected, of the adjuster 10, a pair of first stoppers 103, 103 that extend in the longitudinal direction of the adjuster 10, oppose to each other in the Y-axis direction, and are hollow are provided. Each of the first stoppers 103 has an open end 103*a* at a side of the first guide unit 63 that is connected to the adjuster 10 and a closed end 103*b* at a side opposite to the open end 103*a* in the longitudinal direction of the adjuster 10. Additionally, a linear notch 103*c* is formed on an extension line of each of the rail parts 63*g* of the first guide unit 63 that is connected to the adjuster 10 at each of inner side surfaces in the opposite direction of both of the first stoppers 103, 103.

The stopping unit 64 is connected to the first guide unit 63 existing at a position corresponding to a right end of the drawn portion 62 when the first guide 6 is drawn from the first storage portion 22 of the inside of the first guide 2 shown in FIG. 1. A constitution and a structure of the stopping unit 64 are the same as those of the first guide unit 63 except the following two points. That is, the supporting piece 63*h* protruding inward in the opposite direction of both of the side walls 63*a*, 63*a* of the first guide 63 is removed. On the other hand, in the stopping unit 64, the second stopper 64*a* extending from each of the rail parts 63*g* to an upper end of each of the side walls 63*a* is provided at a connecting end to the first guide 63.

For example, when each of the screen retaining members 9 is attached to each of the first guide units 63 of the first guide 6, the stopping unit 64 is detached from the first guide 6 and the base 91 of each of the screen retaining members 9 is inserted into the inside of each of the storage parts 63*i* shown in FIG. 4D of the first guide unit 63 to which the stopping unit 64 is connected. Subsequently, when the base 91 is moved in the longitudinal direction of the first guide 6 along the rail part 63*g* of each of the first guide units 63, one end portion in the longitudinal direction of the base 91 of each of the screen retaining members 9 enters an inside of each of the first stoppers 103 through the open end 103*a* of each of the first stoppers 103 from the first guide unit 63 connected to the adjuster 10. Then, the one end in the longitudinal direction of the base 91 of each of the screen retaining members 9 comes into contact with the closed end 103*b* of each of the first stoppers 103. At this time, the needle-like parts 92 attached to the base 91 that enters the inside of the each of the first stoppers 103 protrude inward in the opposite direction of both of the first stoppers 103, 103 from the slit 102 formed at each of the first stoppers 103. Additionally, the other end in the longitudinal direction of the base 92 of each of the screen retaining members 9 is disposed at a right end of the first guide unit 63 that exists at the position corresponding to the right end of the drawn portion 92 when the first guide 6 is drawn from the first storage portion 22 of the inside of the first frame 2. In this state, the stopping unit 64 is connected to the first guide unit 63 at which the other end in the longitudinal direction of the base 91 of each of the screen retaining members 9 is disposed. At this time, the other end in the longitudinal direction of the base 91 of each of the screen retaining members 9 comes into contact with the second stopper 64*a* of the stopping unit 64.

In other words, in the attached state of each of the screen retaining members 9 to each of the first guide units 63, as above-mentioned, in addition that the base 91 is supported between each of the rail parts 63*g* and each of the supporting parts 63*h*, the one end in the longitudinal direction of the base 91 of each of the screen retaining members 91 comes into contact with the closed end 103*b* of each of the first stoppers 103, and the other end in the longitudinal direction of the base 91 of each of the screen retaining members 9 comes into contact with the second stopper 64*a* of the stopping unit 64. Therefore, movements of each of the screen retaining members 9 in the longitudinal direction of the base 91 are regulated. Accordingly, despite the repetition of bringing out of and storing in the first frame 2 of the first guide 6, it can be suppressed that each of the screen retaining members 9 slips out of between each of the rail parts 63*g* and each of the supporting pieces 63*h* that are provided with each of the first guide units 63 of the first guide 6 in the longitudinal direction of the base 91.

Additionally, in one end portion in the longitudinal direction of each of the screen retaining members 9, at which the base 92 enters the inside of each of the first stoppers 103, the needle-like parts 91 protrude inward in the opposite direction of both of the first stoppers 103, 103 through the notch 103*c* and do not come into contact with the second stopper 64*a*. Accordingly, slipping out of each of the screen retaining members 9 in the longitudinal direction of the base 91 can be suppressed without damaging the needle-like parts 92.

In this connection, a plurality of the stopping units 64 can be connected in the connecting direction of each of the first guide units 63. In the screen apparatus SD shown in FIG. 1, the roller pipe 31 is built in the inside of the second frame 3, and when the closing operation causing the first frame 2 to slide leftward is performed, the screen 1 wound around the roller pipe 31 is unwound accompanying the closing operation. If the first guide 6 is formed by the connecting the first guide units 63 up to the fixed end to the second frame 3, it is considered that an unwound portion of the screen 1 will come into contact with each of the supporting pieces 63*h* of some of the first guide units 63 positioned at a side of the fixed end, the lower end portion of the screen 1 will be distorted inward in the opposite direction of both of the side walls 63*a*, 63*a* of each of the first guide units 63, and the lower end portion of the screen 1 will wear due to rubbing with any of inner parts of the side walls 63*a*, 63*a*. As above-mentioned, since the supporting pieces 63*h* of each of the first slide guide units 63 are removed in the stopping unit 64, the stopping unit 64 is effective for the screen apparatus SD.

Figure 8:
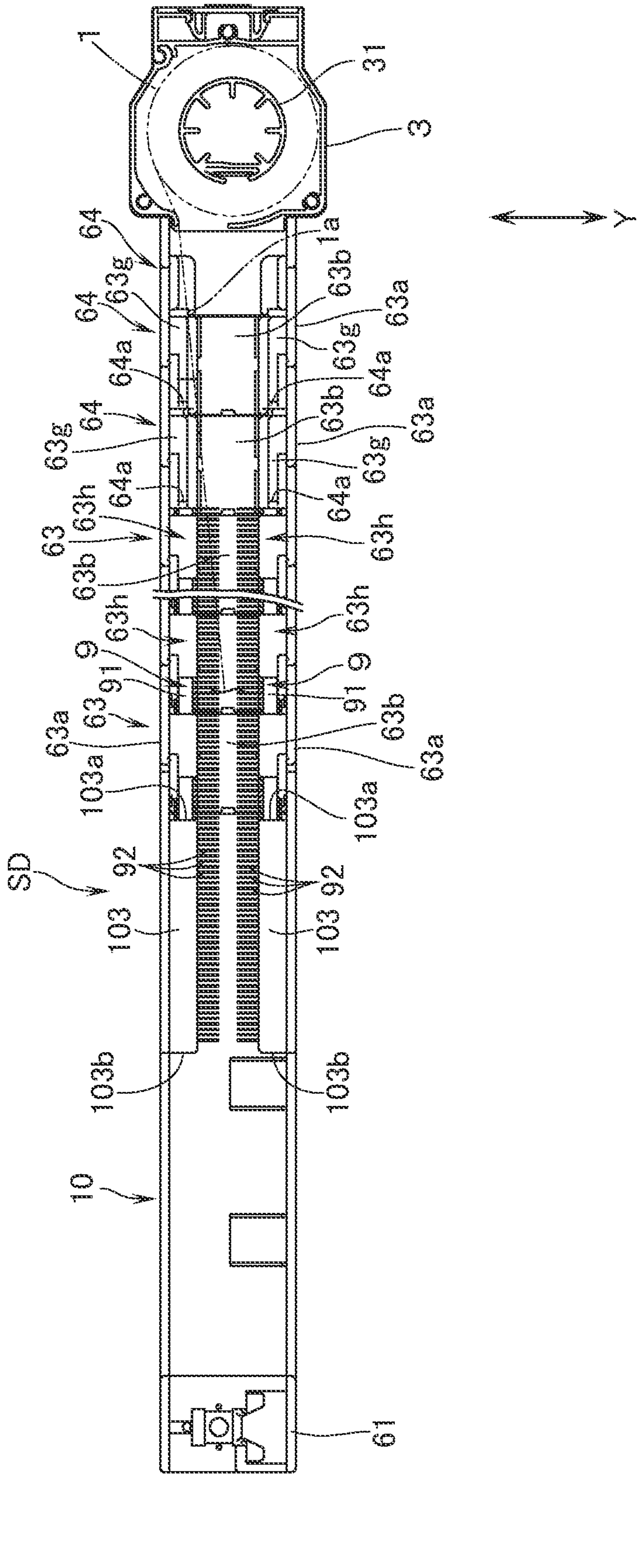
FIG. 8 is a main plan view of an embodiment of the first guide to which the adjuster and the stopping unit shown in FIGS. 7A and 7B are adapted to the screen apparatus shown in FIG. 1.

As shown in FIG. 8, for example, two or more of the stopping units 64 are connected to the right end portion of the first guide 6, which is positioned at the side of the fixed end to the second frame 3, and one stopping unit 64 in the two or more of the stopping units 64, which is positioned at the left end, is connected to the first guide unit 63. In such the screen apparatus SD, a portion positioned at the side of the fixed end of the first guide 6 can be suppressed from coming into contact with an unwound portion 1*a* of the screen 1.

Accordingly, it can be overcome that, at the time of the closing operation of the first frame 6, the lower end portion of the unwound portion 1*a* of the screen 1 from the roller pipe 31 is distorted inward in the opposite direction of both of the side walls 63*a*, 63*a* of each of the first guide units 63 and wears due to rubbing with any of the inner parts of the side walls 63*a*, $\mathbf{63}a_1$.

Incidentally, the tension member 8 shown in FIG. 1 is, for example, a string. The tension member 8 is hung on both of the direction changing members 15, 15, one of which is disposed at the lower end portion of the first storage portion 22 and the other of which is disposed at the upper end portion of the first storage portion 22, and is passed from the first storage portion 22 to the second storage portion 23 through both of the first guiding pieces 21, 21. A ball knot is formed at an end portion of the tension member 8. The ball knot is inserted into a not-shown slit which is formed at a lower end part of the guided member 12 forming the free end 71 of the second guide 7 and downwardly extends, is caught in a lower end edge part of the guided member 12, and is fixed to the guided member 12. Additionally, a portion of the other end side of the tension member 8 is hung on a part of a right end side of a screw head from above and upwardly directs again and another ball knot is formed at an upper end part of the portion of the other end side of the tension member 8. Another ball knot is inserted into a not-shown slit which is formed at an upper end part of the guided member 12 forming the free end 71 of the second guide 7 and downwardly extends, is caught in an upper end edge part of the guided member 12, and is fixed to the guided member 12. The screw is passed through an inside of a slot that is formed in the guided member 12 and extends in the top-bottom direction. A tightening position in the top-bottom direction of the screw with respect to the guided member 12 is adjusted and a prescribed tension is applied to the tension member 8. Further, a portion of the tension member 8, which is positioned at the first storage portion 22 between both of the direction changing members 15, 15, is pressed leftward and is fixed to the upper end part of the adjuster 10 forming the free end 61 of the first guide 6 by the screw. Thus, the tension member 8 connects the free end 61 of the first guide 6 and the free end 71 of the second guide 7, and forms a loop disposed in the top-bottom direction. A stored length in the first storage portion 22 and a drawn length of the first storage portion 22 of the first guide 6 become equal to a stored length in the second storage portion 23 and a drawn length of the second storage portion 23 of the second guide 7 due to the loop formed by the tension member 8. As a result, a parallel sliding of the first frame 2 with respect to the second frame 3 can be certainly realized. Additionally, the parallel sliding of the first frame 2 is realized by the closing operation of the user at an arbitrary portion in the top-bottom direction of the first frame 2. Further, the parallel sliding of the first frame 2 is also realized during the opening operation due to the elastic force of the coil spring 31*a*. The prescribed tension applied to the tension member 8 is appropriately set under consideration of the above-mentioned sliding of the first frame 2.

Though the invention is descried regarding the above-mentioned embodiment, the invention is not restricted to the above-mentioned embodiment. For example, in addition to such the automatic storage manner using the elastic force of the coil spring 31*a* as in the above-mentioned embodiment, an automatic opening and closing manner using a torque when a motor rotates for the expansion and storage of the screen 1 and an opening and closing manner manually performing both of the expansion and storage of the screen 1 may be applicable to the screen apparatus SD. Additionally, a foldable screen in which a plurality of pleats are formed can be adopted to the screen 1. Further, in the case of the screen apparatus SD of the manual opening and closing manner, the second frame 3 is not fixed to the above-mentioned opening and is made slidable in the left-right direction like the first frame 2, whereby a screen apparatus SD can be a double-opening manner. Furthermore, the Z-axis direction is not limited to the vertical direction but may be an orthogonal direction with respect to the X-axis direction. For example, the screen apparatus SD can be installed in an inclined opening that is inclined with respect to the vertical plane.

EXPLANATION OF SYMBOLS

SD Screen apparatus
1 Screen
2 First frame
3 Second frame
6 First guide
61 Free end of first guide 6
62 Drawn portion of first guide 2 from inside of first guide 6
63 First guide unit
63*a* Side wall
63*b* Bottom wall
63*c* Pin
63*d* Opening
63*g* Rail part
63*h* Supporting piece
64 Stopping unit
64*a* Second stopper
7 Second guide
71 Free end of second guide 7
72 Drawn portion of second guide 7 from inside of second guide 7
8 Tension member
9 Screen retaining member
91 Base
92 Needle-like parts
VL Imaginary line
10 Adjuster
101 Weight
103 First stopper
103*a* Open end
103*b* Closed end
103*c* Notch

What is claimed is:

1. A screen apparatus, in which a screen that can be freely expanded and stored is provided, and an expansion and storage direction of the screen is defined as an X-axis direction among three orthogonal axes including the X-axis, a Y-axis, and a Z-axis, the X-axis direction and a Z-axis direction each have first and second opposite sides, the screen has first and second ends in the X-axis direction and first and second end portions in the Z-axis direction, the first side in the X-axis direction is defined as corresponding to the first end of the screen in the X-axis direction, the second side in the X-axis direction is defined as corresponding to the second end of the screen in the X-axis direction, the first side in the Z-axis direction is defined as corresponding to the first end portion of the screen in the Z-axis direction, and the second side in the Z-axis direction is defined as corresponding to the second end portion of the screen in the Z-axis direction, the screen apparatus comprising:

a pair of frames, consisting of a first frame and a second frame, at least one of which is a slidable frame in the X-axis direction, the first and second frames being longitudinal in the Z-axis direction and hollow, and being disposed opposite to each other in the X-axis direction;

a first guide and a second guide each having first and second ends in the X-axis direction, one of the first and second ends of each of the first and second guides being a free end, the first guide and the second guide being drawn from an inside of the at least one slidable frame when the at least one slidable frame is slid to the first side in the X-axis direction and being stored in the inside of the at least one slidable frame when the at least one slidable frame is slid to the second side in the X-axis direction; and a tension member stored in the inside of the at least one slidable frame and connecting the free end of the first guide and the free end of the second guide, wherein the end of the screen in the X-axis direction is fixed to the first frame and the second end of the screen in the X-axis direction is fixed to the second frame, a portion of the first guide, which is drawn from the inside of the at least one slidable frame, is configured to extend linearly in the X-axis direction between a second end portion of the first frame in the Z-axis direction and a second end portion of the second frame in the Z-axis direction, and a portion of the second guide, which is drawn from the inside of the at least one slidable frame, is configured to extend linearly in the X-axis direction between a first end portion of the first frame in the Z-axis direction and a first end portion of the second frame in the Z-axis direction, wherein the first guide is formed by connecting a plurality of first guide units, each of the first guide units having first and second end parts in the X-axis direction and including a pair of side walls disposed opposite to each other in the Y-axis direction when the first guide is drawn from the inside of the at least one slidable frame, each side wall having first and second end parts in the X-axis direction, and a bottom wall connecting both of the side walls, wherein one of two adjacent first guide units is pivotally supported by another of the two adjacent first guide units, whereby the first guide not only bends to the first side in the Z-axis direction but also maintains linearity in the X-axis direction, and the second end portion in the Z-axis direction of the expanded screen is inserted between both of the side walls of each of the first guide units in the portion of the first guide, which is drawn from the inside of the at least one slidable frame, wherein a pin extending outward from each of the side walls is provided at the first end part on the first side in the X-axis direction of each of the side walls of each of the first guide units, and an opening is opened in the second end part on the second side in the X-axis direction of each of the side walls of each of the first guide units, the two adjacent first guide units being connected by fitting, with clearance, each of the pins of the other of the two adjacent first guide units in each of the openings of the one of the two adjacent first guide units, each of the pins forming a pivot, and each of the first guide units being pivotally movable, wherein each side wall of each of the first guide units includes a rail part provided at an inner side part of the side wall, the rail part extending along an imaginary line that connects a pivot center of each of the first guide units in a connecting direction, and a supporting piece protruding inwardly from the side wall and provided at one end edge part of the side wall, the supporting piece being disposed further from the bottom wall than the rail part in the Z-axis direction, wherein a screen retaining member is detachably attached to an inner side of each of the side walls each of the first guide units, the screen retaining member having a plurality of needle parts aligned at intervals and attached to a longitudinal base that extends continuously and is bendable in a pivotal moving direction of each of the first guide units, the screen retaining member having first and second end portions in the X-axis direction, wherein in an attached state of the screen retaining member, the longitudinal base is supported between the rail part and the supporting piece of each of the first guide units, and all of the needle parts protrude inwardly from both of the side walls of each of the first guide units, and wherein when the first guide is drawn to the second side in the X-axis direction accompanying sliding of the at least one slidable frame to the first side in the X-axis direction, the needle parts of each of the screen retaining members stab through the first end portion of the screen in the Z-axis direction, which is inserted between both of the side walls of each of the first guide units in the drawn portion of the first guide, whereby slipping out of the screen from the drawn portion of the first guide is suppressed, and when the first guide is stored in the inside of the at least one slidable frame accompanying sliding of the at least one slidable frame to the second side in the X-axis direction, the needle parts of each of the screen retaining members slip out of the first end portion of the screen in the Z-axis direction, wherein:

a longitudinal adjuster, forming the free end of the first guide, to which a weight is attached and which moves in the inside of the at least one slidable frame in the Z-axis direction, is connected to a first endmost first guide unit, the first endmost first guide unit being the first guide unit of the plurality of first guide units that is positioned farthest toward the first side in the Z-axis direction when the first guide is stored in the inside of the at least one slidable frame, a pair of hollow first stoppers which oppose each other in the Y-axis direction are provided at an end part of the longitudinal adjuster to which the first endmost first guide unit is connected, each of the first stoppers having an open end on the second side in the X-axis direction and a closed end on the first side in the X-axis direction, and a linear notch is formed along the rail part of the first endmost first guide unit, to which the longitudinal adjuster is connected, at an inner side surface of each of the first stoppers;

a stopping unit is connected to a second endmost first guide unit, the second endmost first guide unit being the first guide unit of the plurality of first guide units that exists at a position corresponding to the second end in the X-axis direction in the drawn portion of the first guide when the first guide is drawn from the inside of the at least one slidable frame, and the stopping unit is the same as the second endmost first guide unit except that the supporting piece is removed and a second stopper, extending from each of the rail parts to one end on the first side in the Z-axis direction of each of the side walls, is provided at a connected end on the second side of the X-axis direction of the second endmost first guide unit;

the longitudinal base of the screen retaining member has a length such that a first end portion of the longitudinal base on the first side in the X-axis direction of the screen retaining member comes into contact with the closed end of each of the first stoppers while a second end portion of the longitudinal base on the second side in the X-axis direction of the screen retaining member comes into contact with the second stopper of the stopping unit; and in an attached state of the screen retaining member, the first end portion of the longitudinal base on the first side in the X-axis direction of the screen retaining member is configured to be inserted into an inside of each of the first stoppers of the adjuster and to come into contact with the closed end of each of the first stoppers, the second end portion of the longitudinal base on the second side in the X-axis direction of the screen retaining member is configured to come into contact with the second stopper of the stopping unit, and the needle parts are configured to protrude inwardly from each of the first stoppers through the notch and not to come into contact with the second stopper at a portion of the screen retaining member of which the longitudinal base is inserted into the inside of each of the first stoppers.

* * * * *